United States Patent [19]
Okanoue

[11] Patent Number: 5,719,861
[45] Date of Patent: Feb. 17, 1998

[54] AUTOMATIC ROUTE DETERMINATION METHOD

[75] Inventor: Yasuyo Okanoue, Tokyo, Japan

[73] Assignee: NEC Corporation, Japan

[21] Appl. No.: 663,805

[22] Filed: Jun. 14, 1996

[30] Foreign Application Priority Data

Jun. 15, 1995 [JP] Japan .................. 7-172884

[51] Int. Cl.$^6$ .................................................. H04L 12/66
[52] U.S. Cl. .................................... 370/351; 370/400
[58] Field of Search ............................... 370/351, 401, 370/402, 400, 408, 406, 218, 217

[56] References Cited

U.S. PATENT DOCUMENTS

| | | | |
|---|---|---|---|
| 5,216,675 | 6/1993 | Melliar-Smith et al. | 370/400 |
| 5,355,371 | 10/1994 | Auerbach et al. | 370/400 |
| 5,483,522 | 1/1996 | Derby et al. | 370/400 |
| 5,497,368 | 3/1996 | Reijnierse et al. | 370/351 |
| 5,590,118 | 12/1996 | Nederlot | 370/218 |

FOREIGN PATENT DOCUMENTS

| | | |
|---|---|---|
| 2288637 | 11/1990 | Japan . |
| 338132 | 2/1991 | Japan . |

*Primary Examiner*—Douglas W. Olms
*Assistant Examiner*—Ajit Patel
*Attorney, Agent, or Firm*—Ostrolenk, Faber, Gerb & Soffen, LLP

[57] ABSTRACT

In a network including a simple element having no routing function, each node includes a health-check function to keep track of the respective statuses of its managing simple elements. A source node broadcasts an address request signal (TARP) including the ID of a destination simple element and then waits for its response signal. Each node, receiving the address request signal, further broadcasts it when neither managing nor normally communicating with the destination simple element, and otherwise sends the response signal back to the source node. When the response signal is received from another node, the source node transmits a management message to the destination simple element via the node sending the response signal. Since it is checked that each node normally communicates with its managing simple elements by the health-check function, the node cannot send the response signal in the case where some failure exists between the node itself and the destination simple element.

20 Claims, 6 Drawing Sheets

F I G. 1
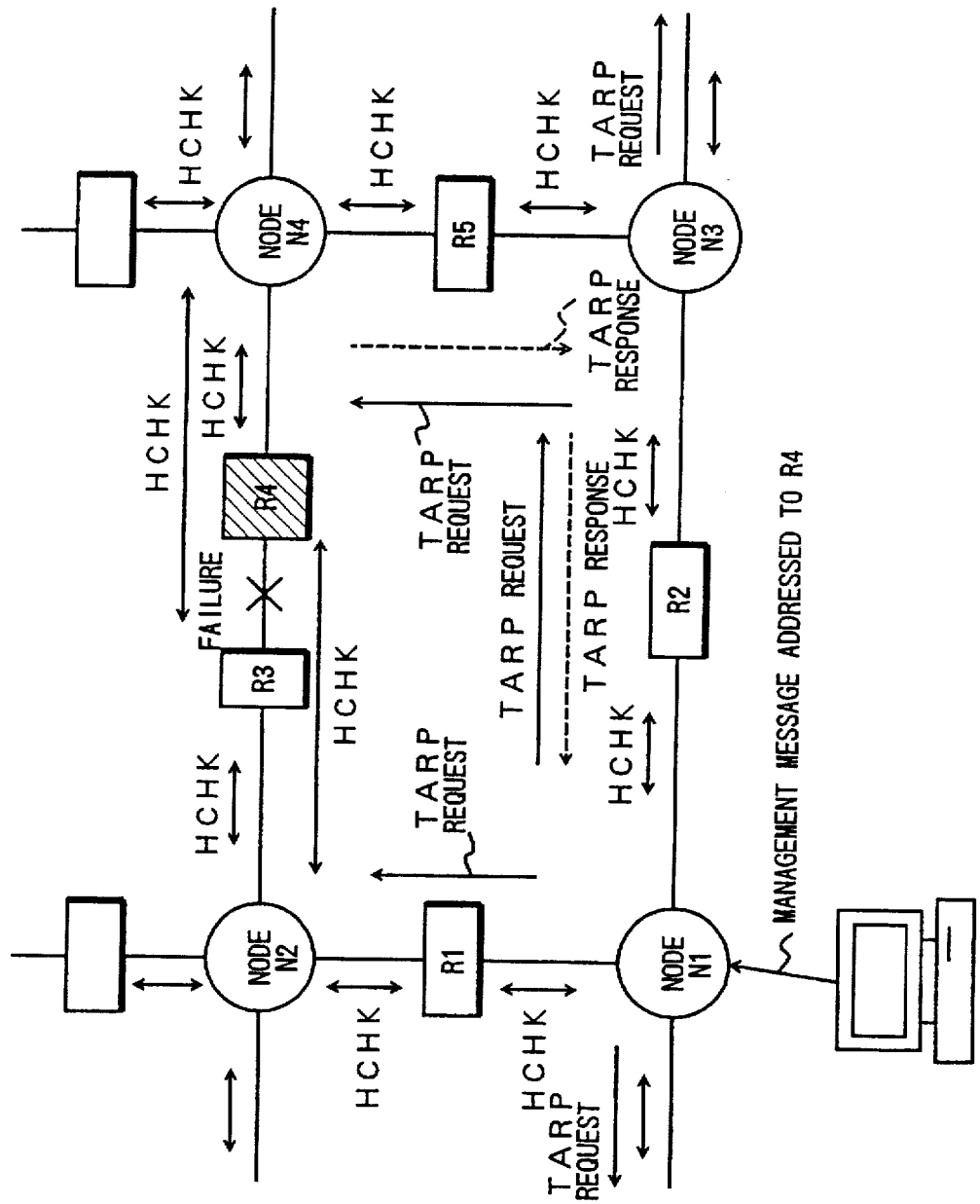

TARP REQUEST PACKET

| HEADER<br>(SOURCE ADDRESS)<br>(BROADCAST) | DATA<br>DESTINATION ELEMENT ID |
|---|---|

TARP RESPONSE PACKET

| HEADER<br>(SOURCE ADDRESS)<br>(DESTINATION ADDRESS) | DATA<br>DESTINATION ELEMENT ID |
|---|---|

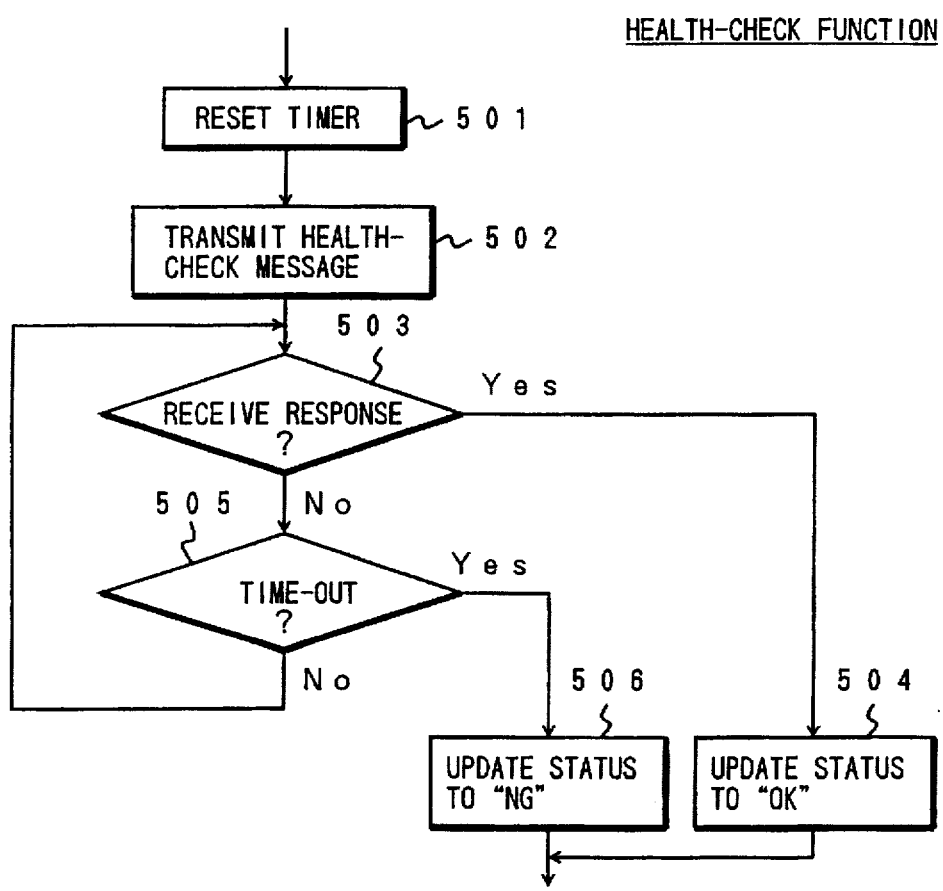

AUTOMATIC ROUTE DETERMINATION METHOD

BACKGROUND OF THE INVENTION

1. Field of the Invention

The present invention relates to a communication network including network elements having no routing function, and in particular to route determination in the communication network when some failure occurs between a network element having no routing function and a node operating with a routing protocol.

2. Description of the Related Art

In a conventional communication network, routing or automatic detouring at the time when some failure occurs is performed by each node implementing a routing protocol such as RIP (routing information protocol) in TCP/IP (transmission control protocol/internet protocol) or IS-IS (intermediate system to intermediate system)/ES-IS (end system to intermediate system) in OSI (open systems interconnection). For instance, in a system disclosed in Japanese Patent Laid-open Publication No. HEI 2-288637, a detouring route is found such that each node retains the addresses of adjacent nodes and transfers data to a selected adjacent node which is the nearest to the destination node of the data. Further, there is disclosed a system in Japanese Patent Laid-open Publication No. HEI 3-38132, where the determination of a detouring route is made by relevant nodes each comparing the network address of a destination node with a routing table storing the network addresses of other nodes.

In the case where a communication network includes simple elements which work without a routing protocol, the message transfer to a specified simple element is performed through a gateway of the simple element. In other words, according to the conventional routing method mentioned above, the node address of the gateway is used in place of the address of the simple element to transfer a management message first to the gateway of the simple element and then to the simple element which is the final destination of the message.

However, since the conventional routing method uses the node address of the gateway in place of the address of the simple element, in cases where some failure occurs between the simple element and the node as its gateway, the management message cannot reach the simple element even if there are possible other routes.

SUMMARY OF THE INVENTION

An object of the present invention is to provide a route determining method which determines a route between source and destination with high reliability.

Another object of the present invention is to provide a route determining method which automatically searches out a route between source and destination even when some failure occurs therebetween.

Still another object of the present invention is to provide a routing method which automatically searches out a detouring route when some failure occurs between a simple element as a destination and a node as a gateway of the simple element so as to send a message to the simple element through the detouring route.

According to an aspect of the present invention, a source node broadcasts an address request signal including the identifier or name of a destination network element and then waits for its response signal. Each node, receiving the address request signal, further broadcasts it when neither managing nor normally communicating with the destination network element, and sends the response signal back to the source node when managing and normally communicating with the destination network element. When the response signal is received from another node, the source node determines the destination address of the destination network element. In such a manner, the route between the source node and the destination network element via the node sending the response signal is automatically produced. Since each node periodically checks for normal communication with its managing network element, the node cannot send the response signal in the case where some failure exists between the node itself and the destination network element. Therefore, the present invention can provide another possible route which detours the failure, resulting in the enhanced reliability of the network.

In other words, in a network comprising a plurality of nodes each operating with a routing protocol and a plurality of network elements each connecting between adjacent nodes and having no routing protocol, wherein a network element is managed by adjacent nodes connected through the network element, a route between a first node and a destination network element is determined as follows. First, an address request signal is broadcast from the first node to the network. The address request signal includes a source address indicating the first node and a destination identifier or name indicating the destination network element. Second, a response signal is sent from a second node back to the first node when the second node manages the destination network element and normally communicates with the destination network element. When a plurality of response signals are received, the earliest one is preferably selected. And the first node determines the destination address for accessing to the destination network element.

Preferably, each node transmits a check signal to a network element which is managed by the node itself at predetermined time intervals. When receiving a response signal from the destination network element within a predetermined time period, the node determines that the node itself normally communicates with the destination network element, and otherwise that the node itself does not normally communicates with the destination network element. Such a check function is referred to as a health check of a network element.

According to another aspect of the present invention, each node in the network is provided with a health-check function and a target address resolution function in addition to a routing function. The health-check function of each node is to periodically monitor each of the network elements which the node itself manages and to keep track of the communication state to each network element. According to the target address resolution function, each node broadcasts an address request signal including the identifier or name of a destination network element or a target ID and, when receiving the address request signal from another node, further broadcasts it when neither managing nor normally communicating with the destination network element, and sends a response signal back to its source node when managing and normally communicating with the destination network element. When the response signal is received from another node, the source node determines to access to the destination network element via the node sending the response signal.

As described above, according to the present invention, each node is provided with the health-check function, and the state of each network element is regularly checked by the managing node. The source node which has broadcast the address request signal receives the response signal only from a node which can directly access the destination network element. In other words, a node which has a trouble on communication for the destination network element does not send the response signal back to the source node since the node cannot normally communicate with the destination network element. Contrarily, only a node unaffected by the failure sends the response signal back to the source node. Therefore, the automatic detouring can be achieved by tracing adjacent nodes one after another in the direction where the response signal has been received.

BRIEF DESCRIPTION OF THE DRAWINGS

FIG. 1 is a schematic diagram showing a configuration of a mesh-type network to explain an operation of a routing method according to an embodiment of the present invention;

FIG. 5 is a flowchart showing an operation of a health-check function according to the embodiment;

FIG. 6 is a schematic diagram showing an example of storage data of a health-check table according to the embodiment;

DETAILED DESCRIPTION OF THE PREFERRED EMBODIMENTS

Figure 2:
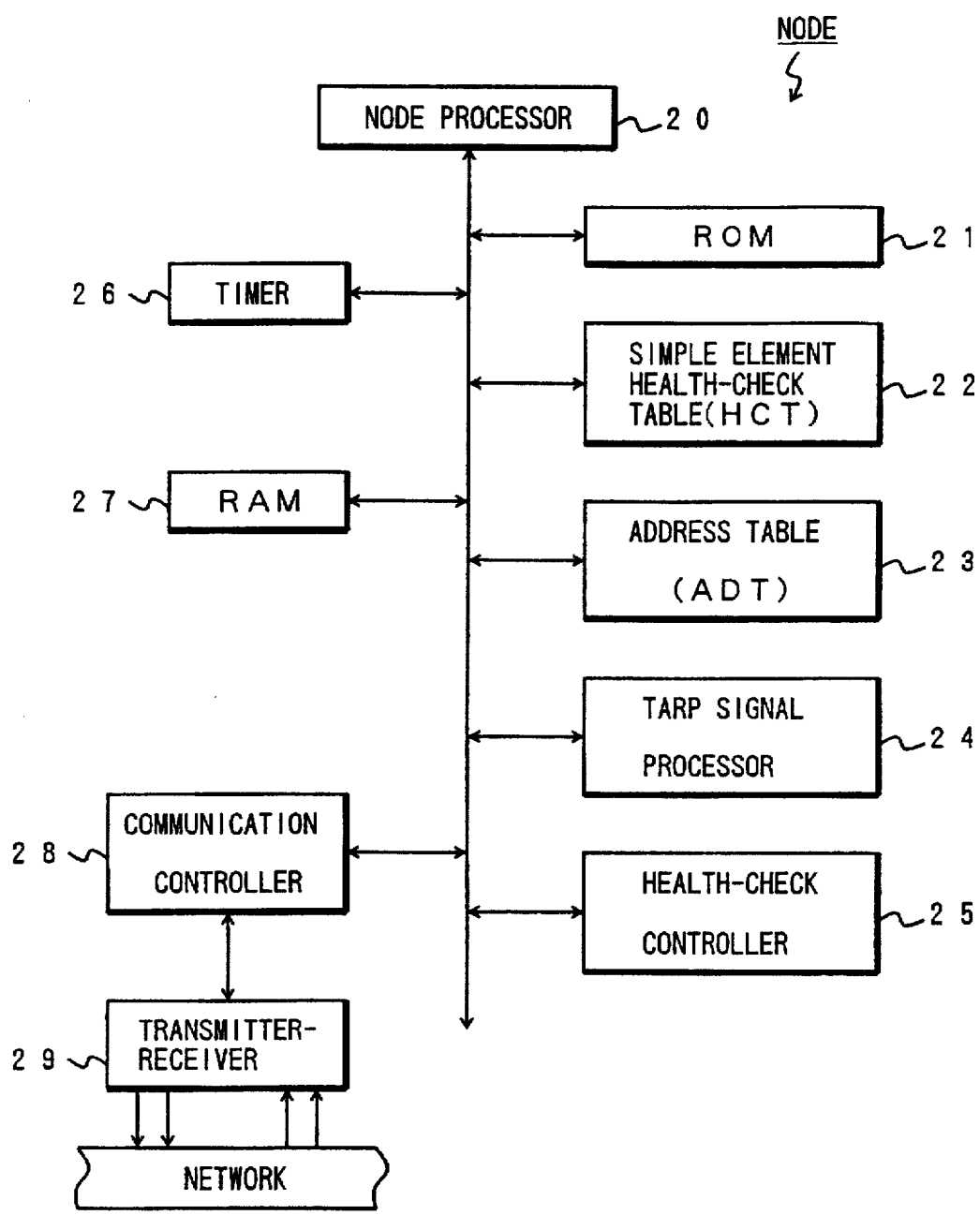
FIG. 2 is a block diagram showing a circuit configuration of each node according to this embodiment.

Referring to FIG. 1, a mesh-type network includes nodes N1–N4 each having at least a routing protocol, wherein the adjacent nodes N1 and N2 are connected through a simple element R1, the adjacent nodes N1 and N3 through a simple element R2, the adjacent nodes N2 and N4 through two simple elements R3 and R4, and the adjacent nodes N4 and N5 through a simple element R5. The simple elements R1–R5 are a network element having no routing protocol, such as a repeater or a bridge. In this mesh configuration network, each node manages the simple elements through which it is connected to the adjacent nodes. More specifically, each node periodically sends a health-check message HCHK to each of the simple elements which are managed by the node, and updates a health-check table provided therein according to the presence or absence of a response to the health-check message HCHK. In this embodiment, when the response is received from a managed simple element, the status 'OK' is stored since information transmission is possible. When no response is received, the status 'NG' is stored since information transmission is impossible. In this manner, each node keeps track of the respective statuses of the managed simple elements.

Hereinafter, it is assumed for simplicity that the simple element R4 is a target element for management and a failure is occurring between the simple elements R3 and R4 which are both managed by the adjacent nodes N2 and N4. Since the broken link is between the simple elements R3 and R4, the status of the simple element R3 is changed from 'OK' to 'NG' in the node N4 and that of the simple element R4 is similarly changed to 'NG' in the node N2 when receiving no response to the health-check message.

In such a mesh configuration network, when receiving a management message to be sent to the simple element R4 from an external interface, the node N1 searches its own address table for the destination ID included in the management message received from outside. When the ID of the simple element R4 fails to be found on the address table, the node N1 broadcasts a TARP (Target Address Resolution Protocol) request as an address request having the destination ID stored into its data field to all the adjacent nodes including the nodes N2 and N3.

Receiving the TARP request through the simple element R1, the node N2 searches its own address table for the destination ID of the simple element R4. Since the simple element R4 is under control of the node N2, the address of the simple element R4 is included in the address table. However, the status of the simple element R4 on the health-check table is 'NG'. Therefore, it is impossible to transfer the management message directly to the simple element R4.

On the other hand, when receiving the TARP request from the node N1 through the simple element R2, the node N3 fails to find the address of the simple element R4 in its own address table. Therefore, the node N3 broadcasts the TARP request to all the adjacent nodes other than the node from which the TARP request is received, that is, the node N1. Receiving the TARP request from the node N3, the node N4 successfully finds the address of the simple element R4 on its own address table, and further its status is 'OK' on the health-check table. Therefore, the node N4 transmits a TARP response including the ID of the simple element R4 back to the node N1. In this case, since the node N1 receives the TARP response only from the node N4, the management message is transmitted to the node N4 which in turn transfers it to the final destination, that is, the simple element R4. In cases where two or more TARP responses are received, the earliest one may be selected for detouring. Thus, a fast detouring route is automatically determined, resulting in reliable transfer of the management message even when some failure exists.

Referring to FIG. 2, a node processor 20 performs various controls in accordance with programs including protocols in the network layer and lower layers stored in a read-only memory (ROM) 21. A simple element health-check table (HCT) 22 stores the respective statuses of simple elements which are managed by the node itself. An address table (ADT) 23 shows the relationship between the identifier of a simple element and its routing address. A TARP signal processor 24 performs a TARP control such that, as described before, a TARP request packet is broadcast to all the adjacent nodes other than the node from which the TARP request packet is received and a TARP response packet to the received TARP request packet is transmitted back to the source node. A health-check controller 25 performs a health-check control such that a health-check message is periodically transmitted to all the managed simple elements of its own and the respective response results are stored in the health-check table 22. A timer 26 is used to control the timing of sending health-check messages and to monitor an elapse time after a health-check message or a TARP request packet is sent. A random access memory (RAM) 27 is a memory that is properly used by the node processor 20. A communication controller 28 performs the routing of received packets under the control of the node controller 20. The transmission and reception of packets including health-check packets are performed by the communication controller 28 through a transmitter-receiver 29.

Figure 3:
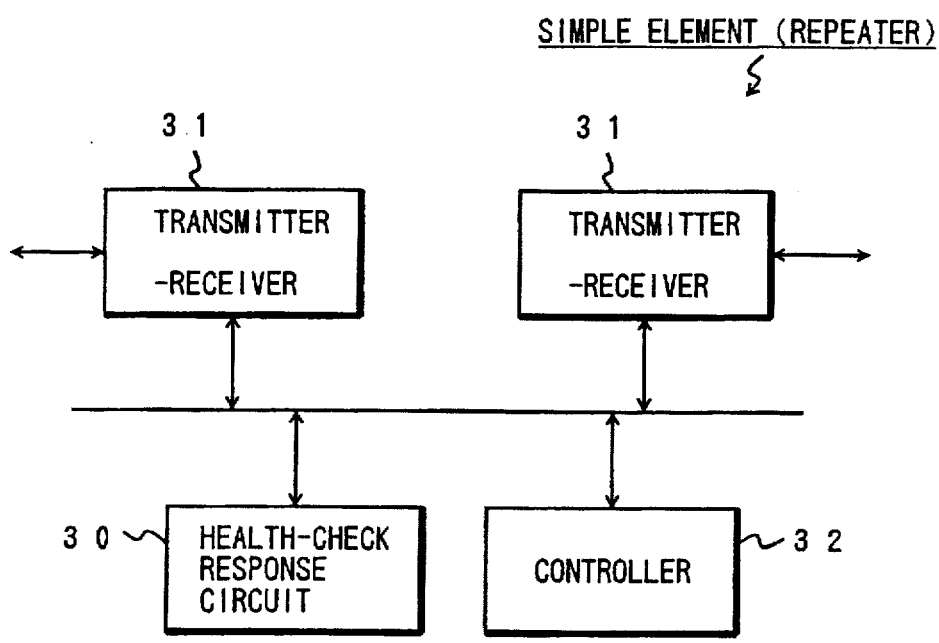
FIG. 3 is a block diagram showing a circuit configuration of a simple element according to this embodiment.

Referring to FIG. 3, a simple element is comprised of a health-check replying circuit 30, a transmitter-receiver 31, and a controller 32. As described above, one or more managing node regularly sends a health-check message to each managed simple element. The health-check replying circuit 30 recognizes such a health-check message received from the managing node through the transmitter-receiver 31, and transmits a health-check response to the managing node through the transmitter-receiver 31. Under the control of the controller 32, the normal data packet other than the health-check message passes through the transmitter-receiver 31. The simple element operates at the OSI model's lowest layer or second lowest layer. If the simple element is a repeater, all the data packet other than the health-check message passes through the transmitter-receiver 31.

Figure 4A:
FIG. 4A is a schematic diagram showing a format of a TARP request packet according to this embodiment.
Figure 4B:
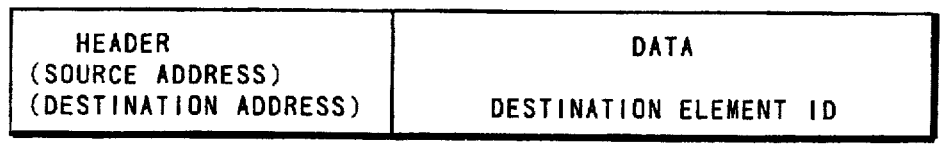
FIG. 4B is a schematic diagram showing a format of a TARP response packet according to this embodiment.

As shown in FIGS. 4A and 4B, the TARP request packet is comprised of a header indicating broadcast and a data field including the identifier (ID) of a destination element. The TARP response packet is comprised of a header including the source address of the node which has transmitted the TARP request packet and a data field including the ID of the destination element.

Health-Check Function

Hereinafter, the health-check function of a node will be described referring to FIGS. 2, 5, and 6.

Referring to FIG. 5, after resetting the timer 26 (step 501), the health-check controller 25 transmits a health-check message to each of the simple elements which are managed by this node (step 502). When receiving a health-check response from a simple element (Yes of step 503), the status of the simple element on the health-check table 22 is updated to 'OK' (step 504). On the other hand, when no response is received, the health-check controller 25 is waiting for the response until the timer 26 exceeds the predetermined time period (No of step 503 and No of step 505). When the time-out occurs (Yes of step 505), the corresponding status of the simple element on the above-mentioned health-check table 22 is updated to "NG" (step 506). In this manner, the health-check operation is regularly performed, and the statuses of the managed simple elements are monitored at all times.

Since a failure occurs between the simple elements R3 and R4 in this example as shown in FIG. 1, the health-check table 22 of the node N2 stores the statuses as shown in FIG. 6, where the status of the simple elements R4 is 'NG'.

1st Tarp Function

Each node has a first TARP function and a second TARP function. The first TARP function is initiated when a management message is received from the external interface, and the second TARP function is initiated when a TARP request packet is received from an adjacent node. The more detailed description will be provided hereinafter.

Figure 7:
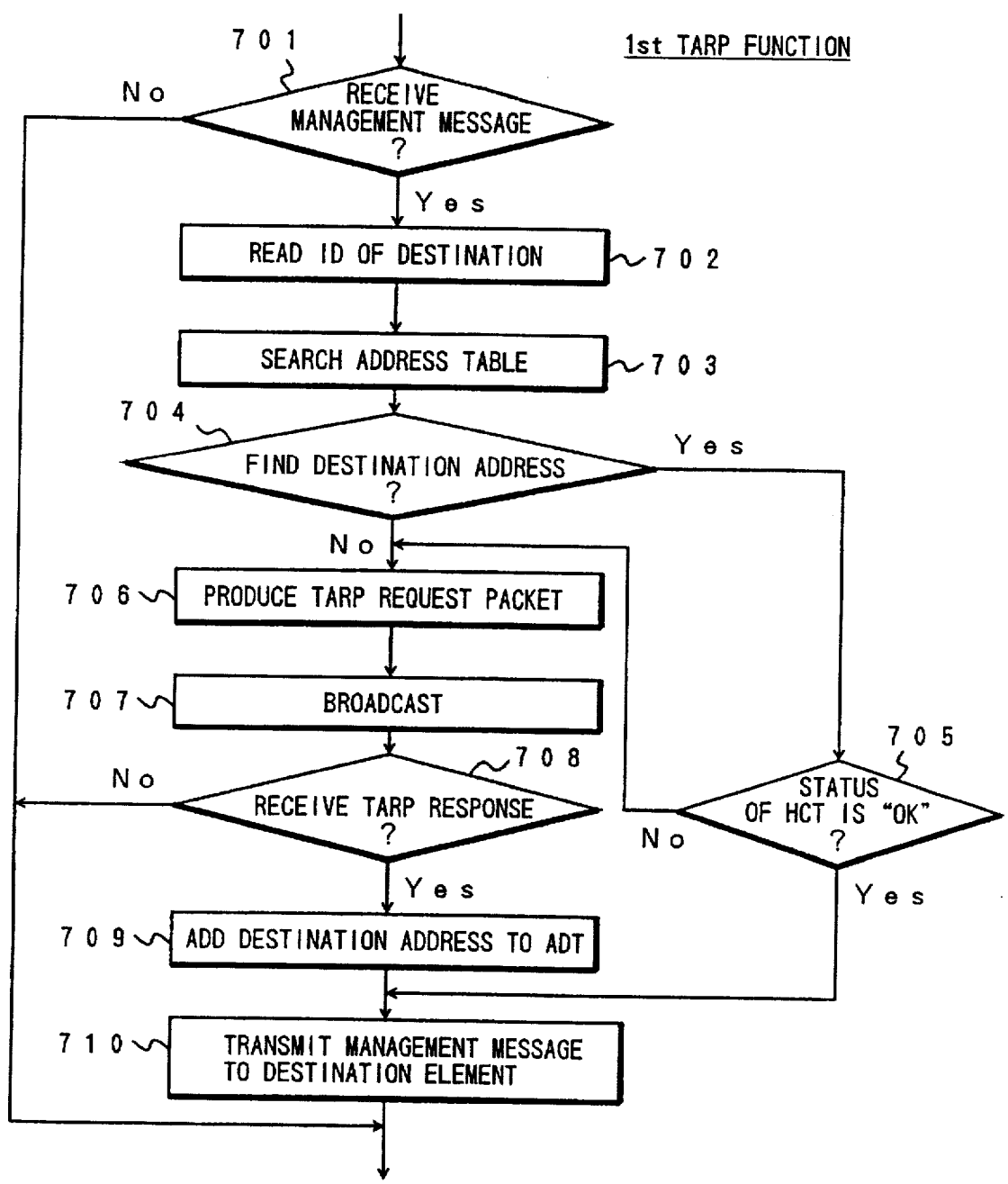
FIG. 7 is a flowchart showing an operation of a first TARP function of each node according to the embodiment.

Referring to FIG. 7, when receiving a management message from the outside interface (Yes of step 701), the node processor 20 reads the destination address from the packet header of the management message (step 702) and searches the address table 23 for the destination address (step 703). If the destination address is found in the address table 23 (Yes of step 704), the node processor 20 further searches the health-check table 22 for the destination address and checks whether the status of the network element specified by the destination address is 'OK' (step 705). If the status is 'OK' (Yes of step 705), the management message is transmitted to the destination element as it is (step 710).

When the status of the network element specified by the destination address is 'NG' (No of step 705), which means that some failure occurs between the node and the destination element, the node processor 20 instructs the TARP signal processor 24 to generate a TARP request packet as shown in FIG. 4A (step 706), and then broadcasts it to all the adjacent nodes (step 707). When the destination address fails to be found in the address table 23 (No of step 704), the steps 706 and 707 are also performed. After the TARP request packet has been broadcast, the TARP processor 24 resets the timer 26 at a predetermined time period and waits for a TARP response packet received from another node (step 708). When receiving the TARP response packet before the timer 26 reaches the predetermined time period (Yes of step 708), the TARP signal processor 24 registers the address of the destination simple element into the address table 23 (step 709), and then the node processor 20 transmits the management message toward the node which originated the TARP response packet with referring to the address table 23 (step 710).

It should be noted that the address of the destination simple element is deleted from the address table 23 after a predetermined time period has passed. Moreover, in cases where the destination element is a node, a single TARP response packet is sent back. In cases where the destination element is a simple element, one or more TARP response packets may be sent back because the simple element may be managed by a plurality of nodes. In the case where a plurality of TARP response packets are received within the predetermined time period, the TARP response packet which has arrived there at first is preferably selected as indicating the shortest route.

2nd Tarp Function

Figure 8:
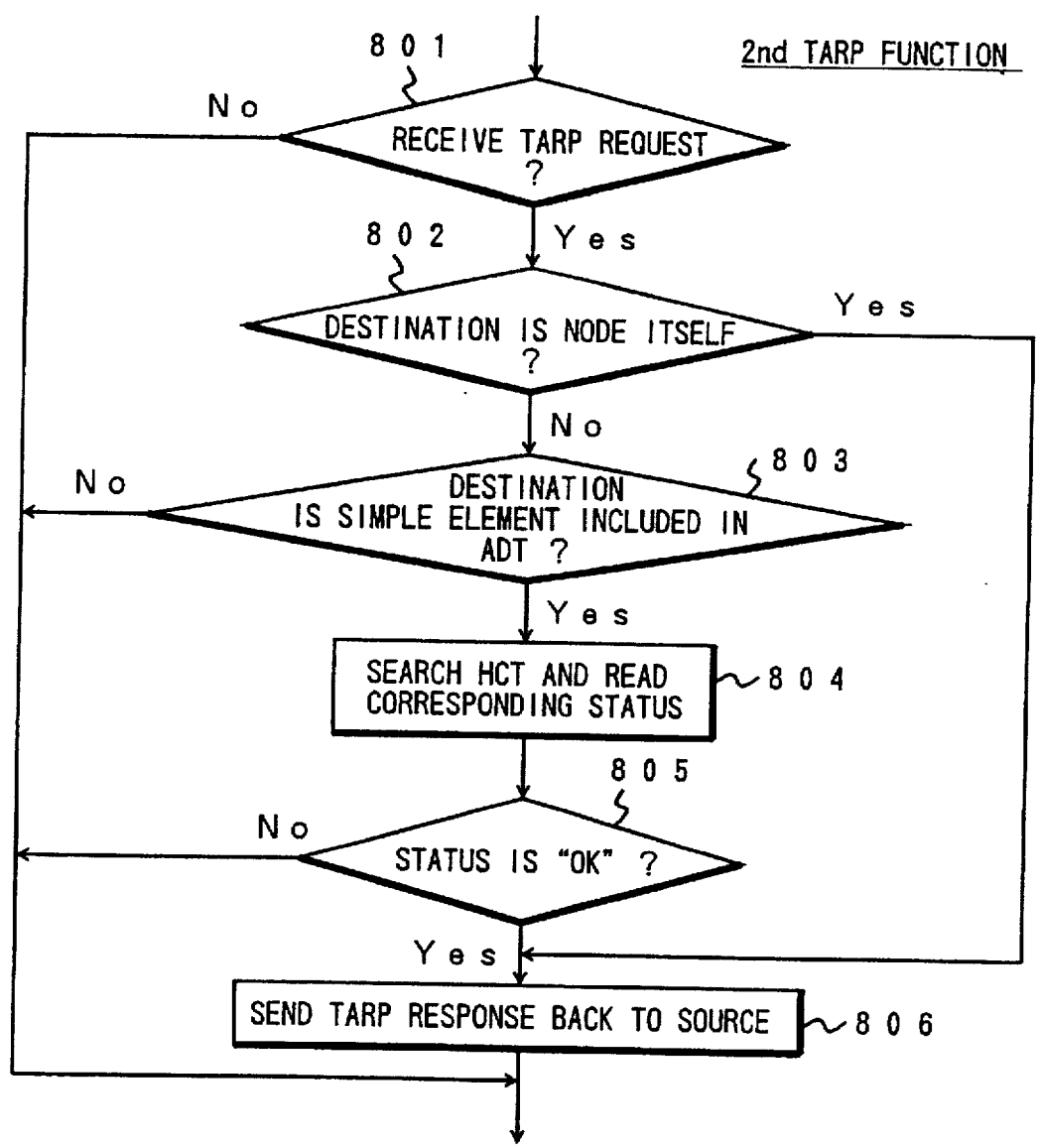
FIG. 8 is a flowchart showing an operation of a second TARP function of each node according to the embodiment.

Referring to FIG. 8, when a node receives a TARP request packet from an adjacent node (step 801), the TARP signal processor 24 of the node checks whether the destination address included in the data field of the received TARP request packet is identical to the address of the node itself (step 802). If the destination address is identical to its own address, the TARP signal processor 24 of the node produces a TARP response packet and sends it back to the node which originated the TARP request packet (step 806).

If the destination address is not identical to the address of its own, the TARP signal processor 24 further searches the address table 23 for the destination address and checks whether the destination address is identical to one of the simple elements which are managed (step 803). If the destination address is identical to the address of a simple element under its own control (Yes of step 803), the TARP signal processor 24 searches the health-check table 22 for the destination address and reads the status of the simple element corresponding to the destination address (step 804). If the status of the simple element is 'OK' (Yes of step 805), the TARP signal processor 24 produces the TARP response packet and sends it back to the node which originated the TARP request packet (step 806).

In the above-mentioned embodiment, the case of the mesh configuration network has been described as an example. However, the present invention is not restricted to this embodiment. It is apparent that the present invention can be similarly applied to a ring network, for example, comprising the nodes N1–N4 as shown in FIG. 1.

What is claimed is:

1. In a network comprising a plurality of nodes each operating with a routing protocol and a plurality of network elements each connecting between adjacent nodes and having no routing protocol, wherein a network element is managed by adjacent nodes connected through the network element, a method for transferring a message from a first node to a destination network element, comprising the steps of:

a) broadcasting a request signal from the first node to the network, the request signal including source information indicating the first node and destination information indicating the destination network element;

b) sending a response signal from a second node back to the first node, the second node managing the destination network element and normally communicating with the destination network element; and c) transferring the message from the first node to the destination network element via the second node.

2. The method according to claim 1, wherein the step (a) comprises the steps of:

at each node receiving the request signal,
checking whether the node itself manages the destination network element; and
broadcasting the request signal when the node itself does not manage the destination network element.

3. The method according to claim 1, wherein the step (a) comprises the steps of:

at each node receiving the request signal,
d) checking whether the node itself manages the destination network element;
e) checking whether the node itself normally communicates with the destination network element when the node itself manages the destination network element; and
f) broadcasting the request signal when the node itself does not normally communicates with the destination network element.

4. The method according to claim 3, wherein the step (e) comprises the steps of:

transmitting a check signal to a network element which is managed by the node itself at predetermined time intervals;
determining that the node itself normally communicates with the destination network element when receiving a response signal from the destination network element within a predetermined time period; and
determining that the node itself does not normally communicates with the destination network element when receiving no response signal from the destination network element within the predetermined time period.

5. The method according to claim 1, wherein the step (b) comprises the steps of:

at each node receiving the request signal,
g) checking whether the node itself manages the destination network element;
h) checking whether the node itself normally communicates with the destination network element when the node itself manages the destination network element; and
i) sending the response signal back to the first node when the node itself normally communicates with the destination network element.

6. The method according to claim 5, wherein the step (h) comprises the steps of:

transmitting a check signal to a network element which is managed by the node itself at predetermined time intervals;
determining that the node itself normally communicates with the destination network element when receiving a response signal from the destination network element within a predetermined time period; and
determining that the node itself does not normally communicates with the destination network element when receiving no response signal from the destination network element within the predetermined time period.

7. The method according to claim 1, wherein:

at the first node,
receiving a management message from outside, the management message including the destination information indicating the destination network element which is a target of the management message;
checking whether the first node itself manages the destination network element;
checking whether the first node itself normally communicates with the destination network element when the first node itself manages the destination network element;
producing the request signal when the first node itself does not manage the destination network element;
broadcasting the request signal to the network;
checking whether the response signal is received within a predetermined time period; and
transmitting the management message to the destination network element through a route via the second node when the response signal is received from the second node within a predetermined time period.

8. The method according to claim 1, wherein:

at the first node,
receiving a management message from outside, the management message including the destination address indicating the destination network element which is a target of the management message;
checking whether the first node itself manages the destination network element;
checking whether the first node itself normally communicates with the destination network element when the first node itself manages the destination network element;
producing the request signal when the node itself does not normally communicates with the destination network element;
broadcasting the request signal to the network;
checking whether the response signal is received within a predetermined time period; and
transmitting the management message to the destination network element through a route via the second node when the response signal is received from the second node within a predetermined time period.

9. The method according to claim 1, wherein:

at the second node,
receiving the address request signal
checking whether the second node itself manages the destination network element;
checking whether the second node itself normally communicates with the destination network element when the second node itself manages the destination network element; and
sending the response signal back to the first node when the second node itself normally communicates with the destination network element.

10. The method according to claim 8, wherein:

at the second node,
receiving the request signal checking whether the second node itself manages the destination network element;

checking whether the second node itself normally communicates with the destination network element when the second node itself manages the destination network element; and sending the response signal back to the first node when the second node itself normally communicates with the destination network element.

11. The method according to claim 7, wherein the route is a detouring route.

12. A network system comprising:

a plurality of nodes each operating with a routing protocol; and a plurality of simple elements each connecting between adjacent nodes and having no routing protocol, each simple element being managed by adjacent nodes connected through the simple element, wherein each node comprises:
  a routing table;
  a status table;
  status checking means for checking whether the node itself normally communicates with a simple element which is managed by the node itself and storing a status of the simple element into the status table;
  checking means for checking whether the node itself manages a given target simple element by referring to the routing table;
  target resolution means for broadcasting an address request signal to the network when the node itself does not manage the target simple element or when the node itself does not normally communicates with the target simple element, the address request signal including source information indicating a source node and destination information indicating the target simple element, and for sending a response signal back to the source node when the node itself manages the target simple element and normally communicates with the target simple element; and
  message transmission means for checking whether the response signal is received from a first node within a predetermined time period and transmitting a message from the source node to the target simple element via the first node by updating the routing table when the response signal is received from the first node within the predetermined time period.

13. The network system according to claim 12, wherein the status checking means comprises:

transmission control means for transmitting a check signal to the simple element which is managed by the node itself at predetermined time intervals; and control means for determining that the node itself normally communicates with the simple element when receiving a response signal from the simple element within a predetermined time period and for determining that the node itself does not normally communicates with the simple element when receiving no response signal from the simple network element within the predetermined time period.

14. A network system comprising:

a plurality of nodes each operating with a routing protocol; and a plurality of simple elements each connecting between adjacent nodes and having no routing protocol, each simple element being managed by adjacent nodes connected through the simple element, wherein each node comprises:
  a routing table;
  a status table;
  status checking means for checking whether the node itself normally communicates with a simple element which is managed by the node itself and storing a status of the simple element into the status table;
  receiving means for receiving a management message from outside, the management message including destination information indicating a target simple element which is a target of the management message;
  checking means for checking whether the node itself manages the target simple element by referring to the routing table;
  first control means for broadcasting an request signal to the network when the node itself does not manage the target simple element or when the node itself does not normally communicates with the target simple element, the request signal including source information indicating a source node and destination information indicating the target simple element, and for sending a response signal back to the source node when the node itself manages the target simple element and normally communicates with the target simple element; and
  second control means for checking whether the response signal is received from a first node within a predetermined time period, and transmitting the management message to the target simple element through a route via the first node by updating the routing table when the response signal is received from the first node within the predetermined time period.

15. The network system according to claim 14, wherein the status checking means comprises:

transmission control means for transmitting a check signal to the simple element which is managed by the node itself at predetermined time intervals; and control means for determining that the node itself normally communicates with the simple element when receiving a response signal from the simple element within a predetermined time period and for determining that the node itself does not normally communicates with the simple element when receiving no response signal from the simple network element within the predetermined time period.

16. The network system according to claim 12, wherein the simple elements include a repeater.

17. The network system according to claim 12, wherein the simple elements include a bridge.

18. The network system according to claim 12, wherein the nodes include a router.

19. The network system according to claim 12, wherein the nodes include a gateway.

20. The network system according to claim 14, wherein the route is a detouring route.

* * * * *